United States Patent [19]

Harper et al.

[11] 4,041,695
[45] Aug. 16, 1977

[54] FUEL SYSTEM PNEUMATIC PURGE APPARATUS AND METHOD

[75] Inventors: John Everett Harper; Louis H. Kell, both of Phoenix, Ariz.

[73] Assignee: The Garrett Corporation, Los Angeles, Calif.

[21] Appl. No.: 634,219

[22] Filed: Nov. 21, 1975

[51] Int. Cl.² .................... F02C 7/22; F02C 9/12; F02C 7/26

[52] U.S. Cl. .................... 60/39.02; 60/39.09 F; 60/39.28 R; 60/39.29; 137/101; 60/39.09 D

[58] Field of Search ......... 60/39.02, 39.09 R, 39.09 F, 60/39.09 D

[56] References Cited

U.S. PATENT DOCUMENTS

| | | | |
|---|---|---|---|
| 2,551,241 | 5/1951 | Buckland | 60/39.09 F |
| 2,814,180 | 11/1957 | Hession | 60/39.09 F |
| 2,818,110 | 12/1957 | Rulseh | 60/39.09 F |
| 3,107,489 | 10/1963 | Palfreyman | 60/39.09 D |
| 3,344,602 | 10/1967 | Davies | 60/39.09 F |
| 3,498,056 | 3/1970 | Avery | 60/39.09 F |

*Primary Examiner*—Clarence R. Gordon
*Attorney, Agent, or Firm*—James W. McFarland; Albert J. Miller

[57] ABSTRACT

A pneumatic purge system retrofittable upon existing gas turbine engines which includes an accumulator for storing pressurized gas at the maximum pressure developed by the compressor of the turbine engine. Upon actuating a solenoid fuel shutoff valve to initiate engine shutdown, stored gas from the accumulator flows into the fuel manifold to purge fuel therefrom into the combustion chamber. Timing of the pneumatic purging sustains the combustion process to burn substantially all the purged fuel.

19 Claims, 1 Drawing Figure

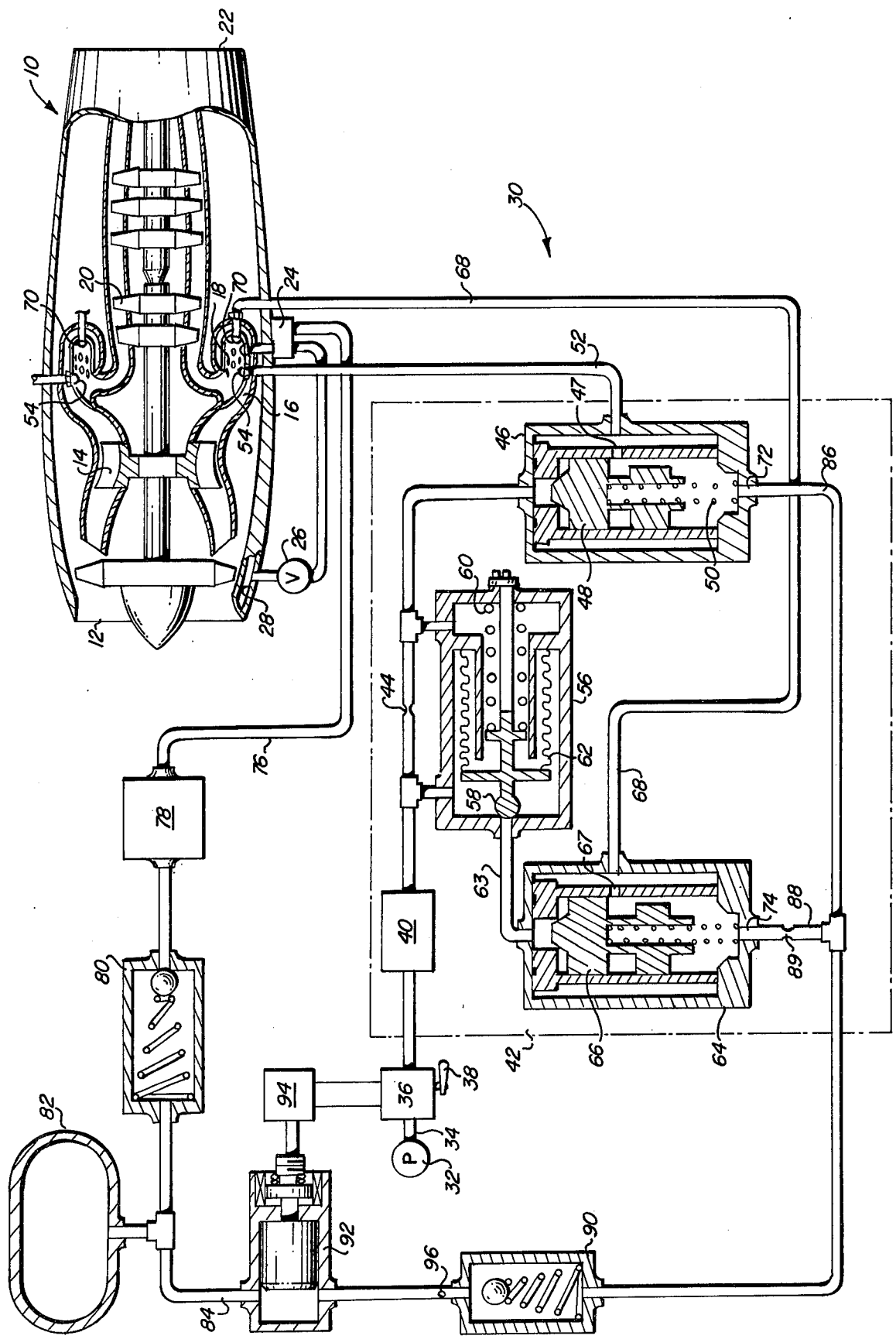

FUEL SYSTEM PNEUMATIC PURGE APPARATUS AND METHOD

BACKGROUND OF THE INVENTION

This invention relates to gas turbine fuel delivery systems, and relates more particularly to an improved method and apparatus for pneumatically purging the fuel manifold during engine shutdown.

Increasingly stringent governmental environmental pollution standards have required the reduction and elimination of emission of unburned hydrocarbons from gas turbine engines. This is particularly troublesome during shutdown operation of such an engine when a substantial volume of fuel remains in the fuel manifold subsequent to shutoff of pressurized fuel flow, the remaining fuel in the manifold is subject to relatively slow leakage into the combustion chamber. Continued air flow through the combustion chamber carries the unburned fuel into the atmosphere. The most successful method, to date, of eliminating this emission of unburned hydrocarbons into the atmosphere has included the drainage of fuel from the manifold, its collection and reintroduction into the engine during the next operating period. Such a method is only partially successful since a substantial portion of the fuel in the manifold may still drain into the combustion chamber rather than into the drainage collection container dependent upon the geometry of the fuel manifold. Further, this arrangement adds excessive weight and takes a substantial portion of valuable space in the engine.

It has also been attempted to provide a purging system for the fuel manifold which includes utilization of a pneumatic accumulator charged with pressurized gas by the compressor of the turbine engine, which pressurized gas is delivered to the fuel manifold upon engine shutdown in order to blow the fuel out of the manifold and into the combustion chamber. This arrangement for gas turbine engines, however, still does not reduce unburned hydrocarbon emissions during shutdown since the raw fuel is simply blown into and carried out of the combustion chamber into the atmosphere. Other arrangements utilized in fuel delivery systems not associated with gas turbine engines contemplate a separate gas compressor which is continually operative to maintain a substantially constant gas pressure source for purging a fuel line coincident with shutdown of the device. Such arrangements are not applicable to the gas turbine field because of the substantial weight, space and additional expense involved in providing a separate, continuously driven compressor. Indicative prior art systems of the type referred to can be found in U.S. Pat. Nos. 2,056,568 of Davis; 2,712,218 of Ritter; 2,818,110 of Rulsch; 2,837,148 of Jay; 3,344,602 of Davies et al; and 3,498,056 of Avery.

SUMMARY OF THE INVENTION

It is a primary object of the present invention to provide an improved method and apparatus for purging the fuel manifold of a gas turbine engine upon shutdown, wherein the fuel in the manifold is blown into the combustion chamber such that the combustion process is continued during purging to burn substantially all the purged fuel, thereby substantially eliminating emission of unburned hydrocarbons into the atmosphere.

Another important object of the present invention is to provide such a fuel purging system which is retrofittable upon existing gas turbine engines.

More particularly, it is an object of the present invention to provide such a fuel purging system which utilizes an accumulator charged with pressurized gas developed by the compressor of the gas turbine engine, and delivered to the fuel manifold in timed relation to interruption of delivery of fuel flow to the manifold so that combustion processes continue during purging. In this manner, a fuel purging system is provided which is applicable to gas turbine engines without adding substantial weight, utilizing additional space, or adding substantial expense to the engine.

More particularly, the present invention contemplates such a fuel purging system which can be located in any convenient nacelle location in the gas turbine engine, and in any convenient attitude without affecting the operation of the purging system. Further, a fuel purging system in accordance with the present invention operates automatically during normal engine shutdown and provides an inherent functional check in any instance of fuel purging system malfunction.

These and more specific objects and advantages of the invention are more particularly set forth in or will become apparent from the following detailed description of the preferred embodiment of the invention when read in conjunction with the accompanying drawing.

BRIEF DESCRIPTION OF THE DRAWING

The single drawing is a partially schematic, partially cross-sectional representation of a fuel purging system as contemplated by the present invention and shown in conjunction with the fuel delivery system of a gas turbine engine such as utilized on aircraft.

DETAILED DESCRIPTION OF THE PREFERRED EMBODIMENT

Referring now more particularly to the drawing, the primary components of the gas turbine engine 10 are illustrated in schematic form. Engine 10 includes a gas flow (normally ambient air) inlet 12 and one or more gas compressor stages 14 which deliver pressurized gas flow through a compressor discharge conduit 16 to a combustion chamber 18. The pressurized gas flow is elevated in temperature in the combustion chamber, then exhausted across one or more turbine stages 20 before exiting from the engine through exhaust nozzle 82. Power is obtained from the engine by rotation of the turbine stages and/or by the jet thrust imparted by the gas exiting from the engine. In use as an engine for providing an aircraft, the engine may conventionally be provided with a bleed air port 24 receiving relatively warm, compressed gas flow from discharge conduit 16 and delivering the heated air flow through a control valve 26 to an inlet duct 28 associated with inlet 12. This flow of heated air provides anti-icing action to inhibit formation of ice at the inlet of the engine.

The engine further includes a fuel delivery system generally referred to by the numeral 30 which includes a source of pressurized fluid fuel flow or pump 32 usually mechanically driven by the engine itself. Pump 32 delivers pressurized fuel flow through a discharge conduit 34, across a solenoid operated shutoff valve 36 (which may also include a manual override shutoff control 38) and through a final fuel filter 40 to a flow divider valve generally referred to by the numeral 42. Pressurized fuel in conduit 34 passes across a fixed flow restrictor 44 to the inlet of a poppet drain valve 46. Valve 46 includes a poppet 48 biased by spring 50 to the closed position illustrated. Pressure of fuel in conduit 34 is effective to shift poppet 48 to an open position allowing fuel flow through a discharge opening 47 to a primary manifold conduit 52. Primary manifold 52 supplies fuel to a plurality of annularly arranged fuel atomizers 54 communicating with the generally annularly shaped combustion chamber 18 at equally space positions around the periphery thereof. The flow divider 42 further includes a pressure differential operated poppet valve 56 having a poppet 58 spring loaded by spring 60 to its illustrated closed position, and a bellows type diaphragm piston 62 traversing the interior of valve 56 to define a pair of opposed fluid receiving chambers on opposite sides of the piston. These two chambers communicate with conduit 34 upstream and downstream of fixed restriction 44. As flow across restrictor 44 increases, the pressure differential across piston 62 increases until poppet 58 is shifted to an open position allowing communication from conduit 34 to a secondary conduit 63. Conduit 63 delivers fuel flow to the inlet of another drain valve, secondary drain valve 64, substantially identical in function to drain valve 46. Pressure in conduit 63 is operable to shift a spring biased poppet 66 to its open position to permit flow from conduit 63 through a discharge opening 67 to a secondary manifold supply conduit 68. Conduit 68 delivers fuel flow to a plurality of secondary fuel spray nozzles 70 arranged in equally spaced relationship about the periphery of annular combustion chamber 18.

Each of the drain valves 46 and 64 have drain ports 72 and 74 which normally communicate with respective primary and secondary manifold conduits 52 and 68 when the associated poppets 48 and 66 are disposed in their closed position illustrated. Drain ports 72 and 74 are conventionally incorporated into the fuel delivery system at a gravitationally lower point therein so as to allow drainage and collection of fuel in the manifolds 52 and 68 upon shutdown. Thus, drain ports 72 and 74 are conventionally located in the engine at a point below combustion chamber 18.

In combination with the above described gas turbine engine 10 and fuel delivery system 30, the present invention contemplates a fuel purge apparatus which includes a pressurized gas supply conduit 76 communicating with anti-icing bleed port 24 and leading across a filter 78 and one-way check valve 80 to an air storage or accumulator tank 82. A gas purging conduit 84 leads from storage tank 82 to the drain ports 72 and 74 of flow divider valve 42 via parallel arranged, branch conduits 86 and 88. Disposed in purging conduit 84 is a one-way check valve 90 and a solenoid operated shutoff valve 92. The winding of shutoff valve 92 and the winding of fuel shutoff valve 36 are connected in parallel with an electrical control 94 such that upon operating control 94 to actuate valve 36 to its closed position, valve 92 is substantially simultaneously energized to the open position illustrated.

Utilization of engine 10 as an aircraft powering unit, auxiliary power unit or in a stationary or other ground installation dictates that for efficient operation the engine run during its normal duty cycle at a maximum or optimum speed. Accordingly, while the engine is operating at the maximum speed, accumulator 82 is charged with pressurized gas at substantially the maximum pressure developed in discharge conduit 16 and combustion chamber 18. Check valve 80 prevents reverse flow from the accumulator to the conduit 16 or combustion chamber 18 whenever pressure in the combustion chamber falls below that stored in accumulator 82. During normal engine operation control valve 92 is disposed in a closed position, and fuel valve 36 is in a position allowing fuel flow from pump 32 to the fuel manifold. Fuel is divided by flow divider 42, a controlled rate of fuel being delivered through primary conduit 52 to the primary fuel nozzles 54, while additional fuel flow is directed through the secondary fuel conduit 68 to spray nozzles 70 into the combustion chamber. Utilization of the flow divider and primary and secondary manifolds assures that the rate of flow to the engine is appropriate during starting.

Upon initiation of shutdown operation of engine 10, the engine is first reduced in speed to a value approximately 60 to 70 percent of its maximum or optimum speed. In use in aircraft, such reduction in engine speed occurs naturally during taxiing subsequent to flight operations. With the reduction in engine speed, the pressure maintained in combustion chamber 18 falls substantially below that stored in accumulator 82. Preferably, the engine is reduced in speed such that the pressure in accumulator 82 is approximately four times that in combustion chamber 18.

Controls 94 are next operated to actuate solenoid operated valve 36 and interrupt fuel flow from pump 32 to the flow divider. Substantially simultaneously with the actuation of valve 36, solenoid control valve 92 is energized to its open position. The stored, pressurized gas in accumulator 82 then passes through purge conduit 84, across check valve 90, and into the two drain ports 72 and 74, and thus to the primary and secondary fuel manifolds 52 and 68. It will be noted that upon occurrence of this shutdown operation, the poppets 48 and 66 shift to closed positions thereby preventing any further fuel flow from that portion of the fuel delivery system upstream of poppets 48 and 66.

The relative magnitude of pressure in combustion chamber 18 and accumulator 82 (approximately a 4 to 1 ratio), along with the relative volume of accumulator 82 in comparison to the volume of the manifold to be purged, which ratio is preferably approximately three to one, along with the relative timing of interruption of fuel flow to the fuel manifold and opening of shutoff valve 92, are all interrelated such that fuel is purged from conduits 52 and 68 into the combustion chamber while the combustion process continues therein. In this manner substantially all the fuel purged from conduit 52 and 68 is consumed in the combustion process, greatly reducing emission of unburned hydrocarbons into the atmosphere during shutdown operations.

Preferably, by the appropriate sizing of accumulator 82 to a volume approximately three times that of the volume of the fuel manifold to be purged, there is sufficient pressurized air stored in accumulator 82 to continue purging of the fuel manifold after completion of the combustion process. This continued flow of air through the fuel manifold, at substantially lower flow rates due to reduced pressure in the accumulator, has a cleansing action on the fuel manifold tending to dry out the manifold and particularly the spray nozzles 54 and 70. By this continued flow of air, any residual traces of fuel are blown off the spray nozzles, and there is no accumulation of unburned hydrocarbons upon the nozzles. This additional cleansing action results in a substantially increased fuel nozzle life. Carbon formation upon the nozzles by heat breakdown of residual fuel traces exposed to the hot combustion chamber is substantially eliminated. Approximately a six-fold increase in fuel nozzle life results.

The above-described fuel purging system inherently incorporates a self-testing feature. In this connection, upon opening the storage tank 82 and purging of the fuel manifold, there is a slight increase in the combustion process resulting in a slight, momentary acceleration of the engine. The operator can thus determine that the fuel purging system is operating correctly by noting this momentary speed increase during shutdown. The relative sizing of the accumulator and the purged fuel manifold to allow this momentary acceleration is, however, not sufficient to cause engine overspeed. In this context it will be apparent that the maximum pressure available is the pressure developed in the combustion chamber at maximum or optimum engine speed. Accordingly, introduction of gas at this pressure cannot increase engine speed above the maximum or optimum level. A slight overspeed condition can occur if the engine is shutdown at high altitude, low ambient pressure conditions after the accumulator has been charged with pressurized gas while the engine was operating at lower elevations. Again, however, the sizing of accumulator 82 relative to the fuel manifold and the amount of fuel available in the manifolds for combustion is such that any such overspeed is not considered excessive.

It is important to note that the air accumulator tank 82 reduces substantially in pressure during the purging operation. No continuous replenishing flow of pressurized gas to the accumulator is maintained during purging, and the pressure of gas delivered into the fuel manifold continually reduces during the purging operation. Yet the present invention still maintains the combustion process during purging even though the purging gas flow is not maintained at a constant pressure.

Check valve 90 acts essentially as a redundant reverse flow control, being arranged in series with the drain valves, shutoff valve 92, and check valve 80 to positively avoid reverse fuel flow from the fuel manifold back through air supply conduit 76 to compressor discharge conduit 16. Because of the relative sizing of the primary and secondary fuel manifolds, in many instances it is preferable to include a fixed flow restrictor 89 in the parallel branch conduit 88 supplying the purging gas flow to the larger, less restrictive secondary fuel manifold such that upon purging operation both fuel manifolds are supplied with pressurized gas flow for complete purging thereof. If desired, a very small pressure relief orifice 96 may be incorporated in purge conduit 84 downstream of solenoid shutoff valve 92 to avoid build up of pressure downstream of the shutoff valve during normal engine operation when the purging system is in standby condition. Relief of pressure from this portion of purge conduit 84 assures more positive sealing of both check valves 90 and shutoff valve 92.

In addition to the functional advantage of substantially eliminating emission of unburned hydrocarbons during shutdown operation, the present invention is particularly suitable and advantageous to gas turbine engines by virtue of its compactness, simplicity of structure and minimal number of flow control devices. In this connection, the pneumatic purging system can be retrofitted to existing gas turbine engines. Retrofitting is accomplished by first interconnecting the pressurized air conduit 76 with a convenient bleed air port, such as the bleed air port 24 of the anti-icing arrangement. The purge conduit 84 is interconnected with existing drain ports 72 and 74 upon removal of the conventional collecting basin normally associated with the drain ports 72 and 74. It may be incorporated into or adjacent to an existing engine in any desired attitude since it does not rely upon gravitational feed for the purging operation. Preferably, the purging system is arranged such that the purge conduit 84 extending from solenoid control valve 92 to the fuel manifold is of minimum length.

From the foregoing it will be apparent that the present invention contemplates an improved method of purging fuel from the manifold delivering fuel to the combustion chamber of a gas turbine engine which includes the steps of storing air compressed by the engine at its maximum pressure and reducing engine speed to reduce combustion chamber pressure to a level substantially less than that of the stored air, preferably a four to one pressure ratio. Upon shutting off liquid fuel flow to the fuel manifold during shutdown, a shutoff control valve 92 is energized in timed relation to the shutoff of the fuel flow such that the stored, pressurized gas is delivered to the manifold to blow out liquid fuel into the combustion chamber in a manner sustaining the combustion process. Further, it will be apparent that the invention also contemplates an improved method of retrofitting an existing gas turbine engine with such an improved fuel purging system which includes the steps of interconnecting the pressure air supply line 76 of the purging system with an existing bleed air port from the engine, interconnecting the purge delivery conduit 84 with existing drain port or ports in the fuel manifold, and wiring the solenoid operated control valve 92 in parallel with the solenoid operated fuel shutoff valve to create the required relative timing of operation of these two valves to purge the fuel manifold while maintaining combustion. Simultaneous actuation of solenoid valve 92 can also be accomplished by a micro switch on a manual shutoff arm to the fuel valve 36, or by mechanical linkage to the fuel valve 36.

While a preferred form of the invention has been set forth in detail, the foregoing specific description should be considered exemplary in nature and not as limiting to the scope and spirit of the invention as set forth in the appended claims.

Having described the invention with sufficient clarity that those skilled in the art may make and use it, we claim:

1. A method of purging fuel from the fuel delivery system in a gas turbine engine upon shutdown of the engine, comprising the steps of:
   bleeding air from the discharge of the compressor of the engine during substantially full speed operation;
   storing said bleed air in a pneumatic accumulator;
   reducing engine speed to reduce pressure in the combustion chamber of the engine to a value substantially less than that of bleed air stored in the accumulator;
   interrupting flow of fuel being delivered through a fuel manifold to the combustion chamber;
   communicating said accumulator with said fuel manifold after said engine speed reducing step to purge fuel from the manifold into the combustion chamber; and
   relatively timing said interrupting step and said communicating step whereby the combustion process in the combustion chamber is maintained subsequent to initiation of said communicating step such that fuel purged from the manifold is burned.

2. A method as set forth in claim 1, further including the step of continuing flow of air from the accumulator through said fuel manifold after completion of combustion of said purged fuel to cleanse fuel nozzles in said combustion chamber of residual fuel traces to minimize carbon formation on said nozzles by heat breakdown of the fuel traces.

3. A method as set forth in claim 2, wherein said communicating step includes delivering air from the accumulator to said fuel manifold at a location in the manifold preventing leakage of fuel from upstream of said location into the combustion chamber subsequent to engine shutdown.

4. A method as set forth in claim 1 wherein said timing step includes substantially simultaneously initiating said interrupting step and said communicating step.

5. A method as set forth in claim 1 wherein the pressure in said accumulator substantially continually reduces during said communicating step.

6. A method as set forth in claim 1, further including the step of preventing reverse flow from the accumulator to the compressor during and subsequent to said engine speed reducing step.

7. A method as set forth in claim 6, further including the step of preventing communication between the accumulator and the fuel manifold prior to said communicating step.

8. A method as set forth in claim 1, further including the step of sizing the accumulator relative to the volume of the fuel to be purged from the manifold whereby the volume of gas delivered from the accumulator to the fuel manifold during said communicating step is sufficient to effect combustion of the purged fuel.

9. A method as set forth in claim 8, wherein said speed reducing step includes reducing the speed of the gas turbine engine to a level whereby the pressure of gas in the accumulator is approximately four times the pressure maintained in the combustion chamber, said sizing step including providing an accumulator whose volume is approximately three times the volume of fluid to be purged from the fuel manifold.

10. A method of retrofitting a gas turbine engine to provide purging of fuel manifold delivering liquid fuel to a combustion chamber of the engine, said engine having a bleed air port communicating with the compressor discharge passage of the engine for providing anti-icing, heated air flow to the inlet of the engine, said engine further having a solenoid operated fuel shut-off valve and a drain port communicating with the fuel manifold for normally draining liquid fuel therefrom upon shutdown of the engine, said method comprising the steps of:
operably interconnecting a pneumatic accumulator with said bleed air port whereby gas at compressor discharge pressure developed during substantially maximum engine speed operation is stored in the accumulator;
interconnecting the accumulator with said drain port;
interposing a solenoid operated purge shutoff valve between the accumulator and said drain port for selectively blocking and allowing communication therebetween; and
electrically interconnecting the solenoid of said purge shutoff valve with the solenoid of the fuel shutoff valve whereby upon actuation of said fuel shutoff valve to block fuel flow to said manifold, the purge shutoff valve is energized in relative timing to closing of the fuel shutoff valve to allow communication between the accumulator and the drain port to force fuel in the manifold into the combustion chamber in a manner maintaining combustion therein for substantially complete burning of the purged fuel.

11. In combination with a gas turbine engine having a compressor for compressing gas to an elevated pressure, and a compressor discharge conduit delivering pressurized gas to a combustion chamber:
a fuel delivery system including a source of pressurized fuel and a fuel manifold supplying the pressurized fuel to the combustion chamber;
means for interrupting fuel flow to said manifold when actuated;
a gas accumulator operably communicating with said compressor discharge conduit whereby gas at substantially maximum compressor discharge pressure is stored in the accumulator;
conduit means providing communication between said accumulator and said fuel manifold;
a control valve operably disposed in said conduit means for selectively allowing and blocking gas flow from said accumulator to said manifold; and
a one-way check valve disposed in said conduit means between said shutoff control valve and said fuel manifold for preventing reverse flow from the fuel manifold toward the accumulator.

12. In combination with a gas turbine engine having a compressor for compressing gas to an elevated pressure, and a compressor discharge conduit delivering pressurized gas to a combustion chamber:
a fuel delivery system including a source of pressurized fuel and a fuel manifold supplying the pressurized fuel to the combustion chamber;
means for interrupting fuel flow to said manifold when actuated;
a gas accumulator operably communicating with said compressor discharge conduit whereby gas at substantially maximum compressor discharge pressure is stored in the accumulator;
conduit means providing communication between said accumulator and said fuel manifold;
a shutoff control valve operably disposed in said conduit means for selectively allowing and blocking gas flow from said accumulator to said manifold; and
control means for actuating said shutoff control valve to allow purging gas flow to said manifold in timed relationship to actuation of said fuel flow interrupting means whereby fuel is purged from said manifold and burned in said combustion chamber.

13. A combination as set forth in claim 12, wherein said conduit means communicates with said fuel manifold at a position gravitationally lower than said combustion chamber.

14. A combination as set forth in claim 12, further including a check valve disposed in said conduit means communicating said compressor discharge conduit with said accumulator preventing reverse flow from the accumulator toward said compressor discharge conduit;

15. A combination as set forth in claim 12, further including a one-way check valve disposed in said conduit means between said shutoff control valve and said fuel manifold for preventing reverse flow from the fuel manifold toward the accumulator.

16. A combination as set forth in claim 12, wherein said fuel delivery system includes first and second fuel manifolds for delivering fuel to said combustion chamber, and a flow divider valve communicating with said pump and said first and second manifolds for dividing fuel flow from the pump between said first and second manifolds, said conduit means including first and second branches downstream of said shutoff valve respectively communicating said first and second manifolds in parallel relationship with said accumulator.

17. A combination as set forth in claim 12, wherein the ratio of the volume of said accumulator to the volume of the fuel manifold to be purged is approximately three to one.

18. A fuel purge system adapted for use with a fuel delivery system delivering fuel flow to the combustion chamber of an engine having means for developing pressurized gas flow to the combustion chamber in relation to speed of operation of the engine, said purge system comprising:
 a pneumatic accumulator adapted to communicate with said gas flow pressurizing means whereby gas is stored in the accumulator at substantially maximum pressure developed by the engine;
 means extending from said accumulator and adapted to communicate with said fuel delivery system; and
 control valve means operably disposed in said last mentioned means for selectively allowing and prohibiting gas flow from the accumulator through said last mentioned means to the fuel delivery system independently of pressure of said gas flow.

19. A gas turbine engine, comprising:
 means defining a gas flow inlet;
 compressor means for compressing gas received from inlet;
 a compressor discharge conduit for carrying compressed gas flow from the compressor;
 a combustion chamber for receiving compressed air flow from the compressor discharge conduit;
 a source of pressurized liquid fuel flow;
 a flow divider valve communicating the outlet of said source for dividing fuel flow into first and second streams;
 first and second fuel manifolds for receiving and respectively delivering said first and second streams of fuel flows to said combustion chamber to maintain a continuous combustion process in the combustion chamber during operation of said engine to heat gas delivered thereto;
 a gas accumulator;
 a first conduit extending between said pressure discharge conduit and said accumulator for delivering gas flow to the latter;
 a one-way check valve disposed in said first conduit for preventing reverse fluid flow from the accumulator to the compressor discharge conduit;
 a second conduit extending between said accumulator and said first and second fuel manifolds;
 check valve means disposed in said second conduit for preventing reverse flow from said manifolds towards said accumulator;
 a solenoid operated fuel shutoff valve operably communicating with said source of pressurized fluid for selectively allowing and blocking fuel flow to said manifolds;
 a solenoid operated gas shutoff control valve in said second conduit operable to selectively allow and block gas flow from the accumulator to said manifold; and
 control means operably coupled with said solenoid valves for substantially simultaneously actuating the latter to block fuel flow to said manifolds while allowing gas flow from the accumulator to said manifolds, said control means operable to time said actuation of the solenoid valves whereby fuel in said manifolds is purged therefrom into said combustion chamber while the combustion process therein continues such that substantially all said purged fuel is burned.

* * * * *